(12) United States Patent
Henrion

(10) Patent No.: US 6,728,256 B1
(45) Date of Patent: Apr. 27, 2004

(54) SHARED BUFFER CONTROL DEVICE

(75) Inventor: Michel Henrion, Brussels (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/199,193

(22) Filed: Nov. 25, 1998

(30) Foreign Application Priority Data

Nov. 27, 1997 (FR) .............................................. 97 14917

(51) Int. Cl.[7] .............................................. H04L 12/54
(52) U.S. Cl. ..................... 370/429; 370/412
(58) Field of Search ................................ 370/412, 413, 370/414, 415, 416, 417, 418, 419, 421, 423, 428, 429; 711/151, 124, 150, 154

(56) References Cited

U.S. PATENT DOCUMENTS

| | | | |
|---|---|---|---|
| 5,168,492 A | * 12/1992 | Beshai et al. | ................. 370/353 |
| 5,583,861 A | * 12/1996 | Holden | ................... 370/395.42 |
| 5,715,247 A | * 2/1998 | Nara et al. | ..................... 370/360 |
| 5,721,833 A | * 2/1998 | Cooperman et al. | ........... 710/56 |
| 5,825,767 A | * 10/1998 | Mizukoshi et al. | ....... 370/395.7 |
| 5,845,322 A | * 12/1998 | Leung | .......................... 711/151 |
| 5,864,540 A | * 1/1999 | Bonomi et al. | .............. 370/235 |
| 6,262,986 B1 | * 7/2001 | Oba et al. | .................... 370/399 |

FOREIGN PATENT DOCUMENTS

EP  0 700 187 A2  3/1996

OTHER PUBLICATIONS

Sang H. Kang et al., "A High Speed ATM Switch With Common Parallel Buffers", *Institute of Electrical and Electronics Engineers*, IEEE Global Telecommunications Conference, Singapore, Nov. –14–16, 1995, vol. 3, pp. 2087–2091.

Harufusa Kondoh et al., "A 622–Mb/s 8×8 ATM Switch Chip Set with Shared Multibuffer Architecture", *IEEE Journal of Solid–State Circuits*, vol. 28, No. 7, Jul. 1993, pp. 808–814.

Yu–Sheng Lin et al., "Queen Management for Shared Buffer amd Shared Multi–buffer ATM Switches", *Institute of Electrical and Electronics Engineers*, IEEE Infocom 1996, San Francisco, Mar. 24–28, 1996, vol. 2, pp. 688–695.

* cited by examiner

Primary Examiner—Dang Ton
Assistant Examiner—Phuc Tran
(74) *Attorney, Agent, or Firm*—Sughrue Mion, PLLC

(57) ABSTRACT

The shared buffer control device can be used in a packet or cell switching unit having n1 inputs and n2 outputs and a shared buffer means for storing blocks of data from inputs. The blocks of data are extracted in order and directed to at least one output. The blocks of data are stored in and extracted from the buffer means in periodic cycles, each cycle including time slots in which a block of data received at an input can be stored in memory and a block of data previously store in memory can be extracted to a particular output. The shared buffer includes a plurality of shared sub-buffers which are controlled so that during at least some time slots the writing of a block of input data and the extraction to an output, or reading of a block of data are effected simultaneously in different shared sub-buffers.

24 Claims, 5 Drawing Sheets

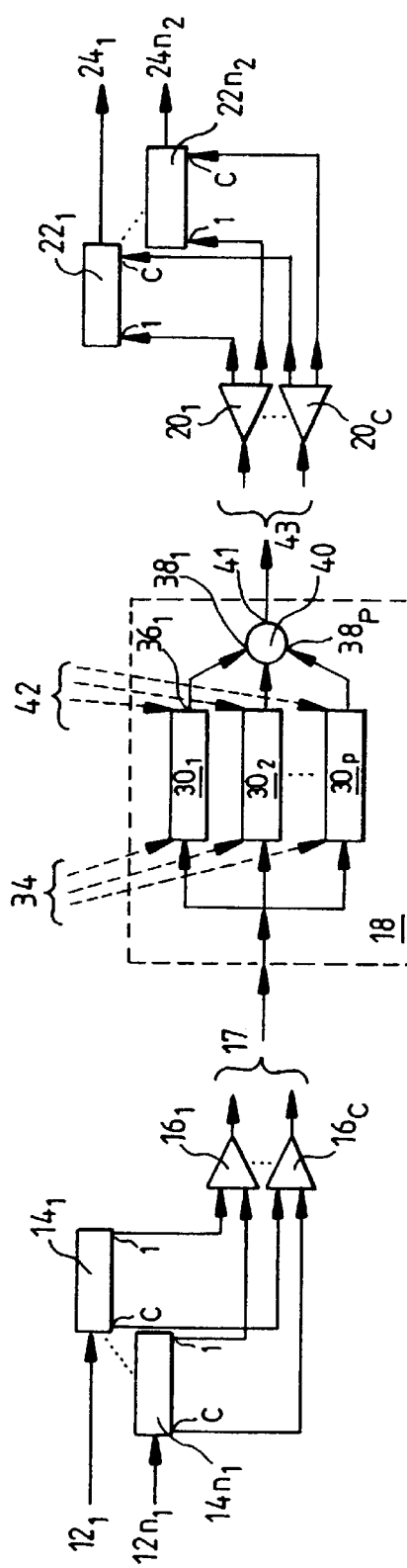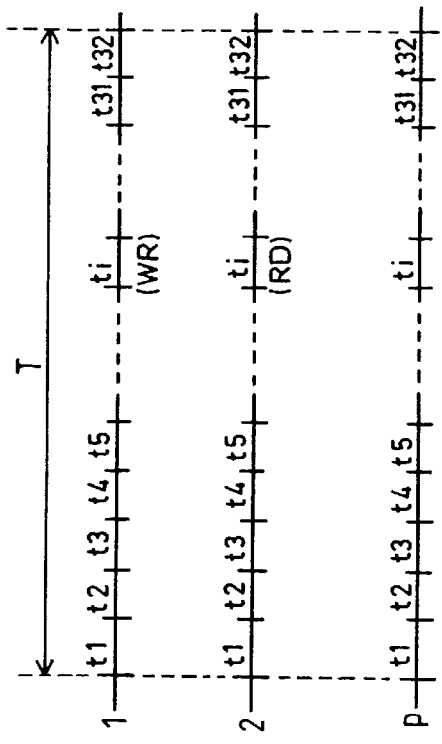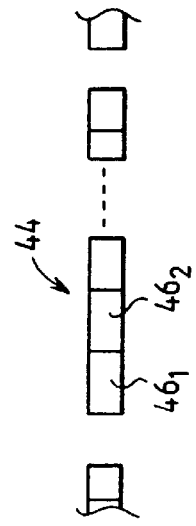

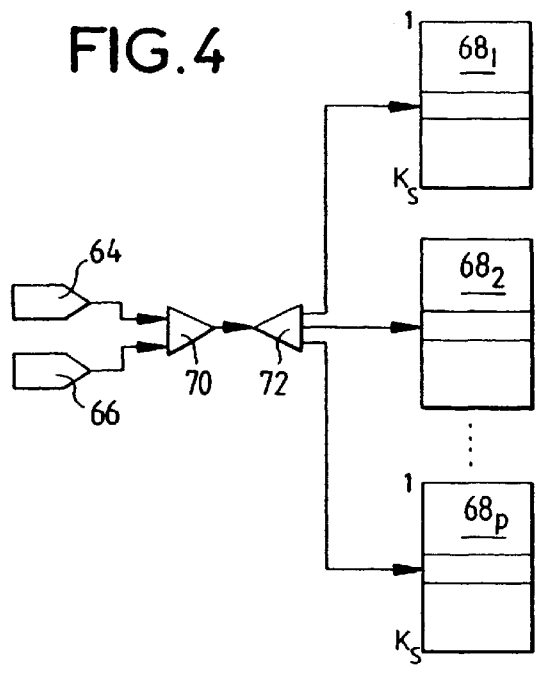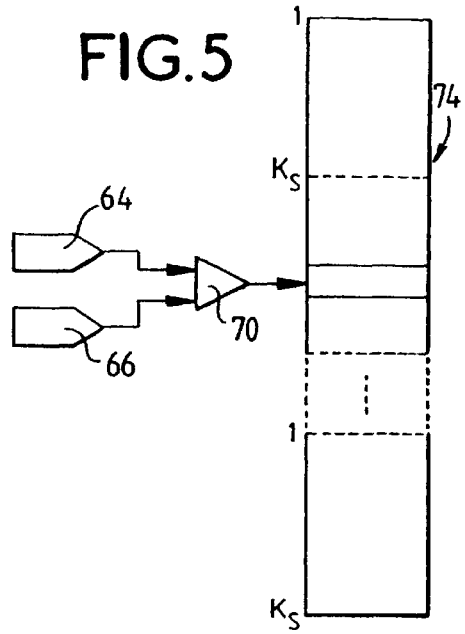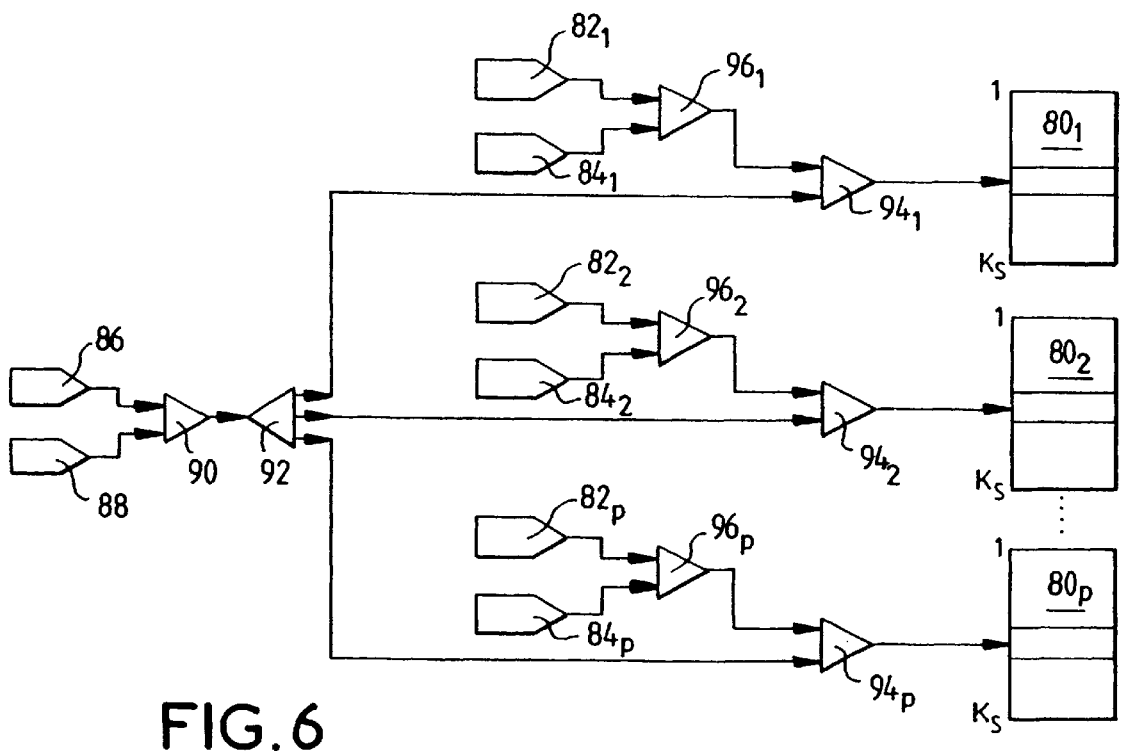

SHARED BUFFER CONTROL DEVICE

This invention relates to a shared buffer control device which can be used in a packet or cell switching unit using buffers or in an input or output terminal module of an asynchronous switching network using buffers.

BACKGROUND OF THE INVENTION

Information is increasingly transmitted using digital signals transmitted in the form of asynchronous data made up of packets or cells that are transmitted from their point of origin to their point of arrival via nodes at which a number of lines converge and from which a multiplicity of lines depart. A packet or a cell must be switched from an input line to at least one output line. This switching, which is effected under the control of a routing algorithm, is performed by switching units each of which comprises a plurality of inputs ($n_1$ inputs) and a plurality of outputs ($n_2$ outputs).

In some conventional switching units input data is stored in a buffer from which it is subsequently extracted to be transmitted to the output chosen by the routing algorithm.

The simplest version of a switching unit of the above kind includes an individual buffer for each of the $n_2$ outputs, each item of input data being written into the buffer relating to the output chosen by the routing algorithm. However, to simplify these units it is known to use a single buffer called a "shared buffer". In this case the switching unit typically includes an input multiplexer and an output demultiplexer and control means for controlling the buffer in particular.

The operation of a unit of the above kind is cyclic. Each cycle corresponds to writing into the shared buffer data received on each of the $n_1$ inputs and to reading from the shared buffer data to be transmitted to each of the $n_2$ outputs. Each cycle is conventionally divided into a number of time slots during each of which a data block read operation and/or a data block write operation is/are effected. During a given time slot comprising both types of operation a data block received on a particular input is written and a data block to be transmitted to a given output is read but a read operation and a write operation at the same buffer location must be effected at different times.

The duration of a cycle is conditioned by three parameters, namely the binary bit rate at the inputs and outputs of the switching unit, the number of bits of a data block processed in parallel, and the number of inputs and outputs of the switching unit. Although it is desirable to increase the capacity ($n_1 \times n_2$) of the switching unit, the duration of a cycle is reduced when the inputs/outputs are at a high bit rate and it is not possible to increase the size of a data block processed in parallel beyond certain limits of complexity.

In broadband applications the need to increase the number of inputs and outputs reduces the duration of the time slots and therefore the time allocated to each operation to write or to read the shared buffer. This can not only lead to prohibitive additional costs but also run up against performance limits of the technology in terms of memory access time.

European Patent Application No. EP 0 700 187 (Mitsubishi) describes a shared buffer control device that includes a plurality of sub-buffers. The shared sub-buffers are controlled so that during at least some time slots writing an input data block and extracting a data block to an output can be effected simultaneously in separate shared sub-buffers, selecting the shared sub-buffers for reading taking priority over selecting the shared sub-buffer for writing.

In this way, for each read operation, as for each write operation, all of the time slot is available whereas with a switching unit of the previous prior art type a time slot has to be shared in order to effect the two types of operation consecutively. The set of shared sub-buffers, all of which have the same capacity and are identical to each other, constitutes a virtual shared buffer equivalent to a single shared buffer of a prior art switching unit.

The prior art control device includes a shared buffer control unit for controlling an input switch and selecting the shared sub-buffer into which a received cell is written. The unit reads a plurality of cells in a plurality of shared sub-buffers during a time cycle corresponding to that of a cell and controls an output switch to transmit each cell read to a selected output. The control device updates a sub-buffer access table having a first dimension representing the number of sub-buffers and a second dimension representing the number of time slots in a time cycle corresponding to that of a cell.

Arbitration between write access and read access to the sub-buffers is controlled in parallel for all access time slots ($n_1$ wrote access and $n_2$ read access for a switching unit with $n_1$ inputs and $n_2$ outputs) in a time cycle corresponding to that of a cell.

OBJECTS AND SUMMARY OF THE INVENTION

The control device is complex and the aim of the present invention is to propose a simpler control device.

In accordance with the invention, a control device for a shared buffer comprising a plurality of shared sub-buffers, a write selector circuit for writing therein data blocks from inputs, and a read selector circuit for reading said data blocks therein afterwards and directing them to at least one output; said two selector circuits including arbitration means for writing and reading data blocks:

in accordance with periodic cycles, each cycle including time slots during each of which a data block received at an input can be written into one of said shared sub-buffers and during which a data block previously written can be read and sent to a particular output;

simultaneously, at least during some of said time slots, writing a data block from an input and reading a data block to be sent to an output in different shared sub-buffers; selecting a sub-buffer for reading taking priority over selecting the same sub-buffer for writing;

wherein said arbitration means include means for arbitrating a single write access vis a vis a single read access during each time slot.

This control device is simpler to produce because arbitration between sub-buffer write access and read access is managed serially, i.e. successively for each Individual time slot for access to a sub-buffer within a time cycle corresponding to that of a cell. It performs a single logic operation during each time slot to arbitrate a single write access relative to a single read access.

To control a device of the above kind it is necessary to take account of the fact that choosing the shared sub-buffer in which to write is limited not only by the availability of free locations in the various shared sub-buffers but also by the unavailability of access to the shared sub-buffer selected for reading, which takes priority. It is therefore necessary to know the number of the shared sub-buffer in which the data block to be read is stored in order to be able to select another shared sub-buffer in which an incoming data block can be stored; this selection is effected in accordance with the availability of free locations of the sub-buffers, for example.

Control must also allow for the risks of blocking during writing. Compared to a switching unit with a single shared buffer, a switching unit in accordance with the invention has an additional risk of blocking, which can occur when only the shared sub-buffer used for reading has free locations and all the other shared sub-buffers accessible for writing are entirely filled. The risk of blocking is an additional risk in that it does not exist in the conventional case of a single shared buffer (in which case it is always possible to write in the last free location, regardless of which one it is).

The additional possibility of blocking decreases as the number of shared sub-buffers increases. However, as increasing the number of buffers makes control more complex, it is in practice preferable to limit this number to a relatively low value.

In one preferred embodiment, the two selector circuits are such that, for each time slot, the choice of the sub-buffer for writing a data block depends on the state and/or the degree of filling of each of the shared sub-buffers.

To reduce the additional risk of blocking it is preferable to write the least heavily loaded shared sub-buffer.

However, this type of control does not entirely eliminate the additional risk of blocking. To eliminate it completely a sufficient capacity must be chosen for the shared sub-buffers. It can be shown that the probability of congestion of the equivalent virtual shared sub-buffer will be less than or equal to the probability of congestion of a unit with a single shared buffer of capacity S if the capacity S' of each shared sub-buffer is such that $S' \geq S/(p-1)$, p being the number of shared sub-buffers.

Another feature of the invention is that the access time allocated to the operations which update the chained lists in the buffers controlling free and/or occupied locations is, compared to a switching unit with a single shared buffer, increased in the same way as the access time allocated to the data block write and read operations is increased.

BRIEF DESCRIPTION OF THE DRAWINGS

The features and advantages of the invention will become apparent from the following description of embodiments thereof given with reference to the accompanying drawings, in which:

FIG. 1 is a block diagram of a switching unit in accordance with the invention,

FIG. 1a is a diagram showing a packet or cell,

FIG. 1b is a diagram illustrating the operation of the unit shown in FIG. 1,

FIG. 4 shows a circuit for controlling occupied locations for the shared sub-buffers of the unit from FIG. 1, FIG. 5 is a variant of FIG. 4, FIG. 6 is a block diagram of a combined control circuit for free and occupied locations for the shared sub-buffers of the unit from FIG. 1.

MORE DETAILED DESCRIPTION

Figure 2:
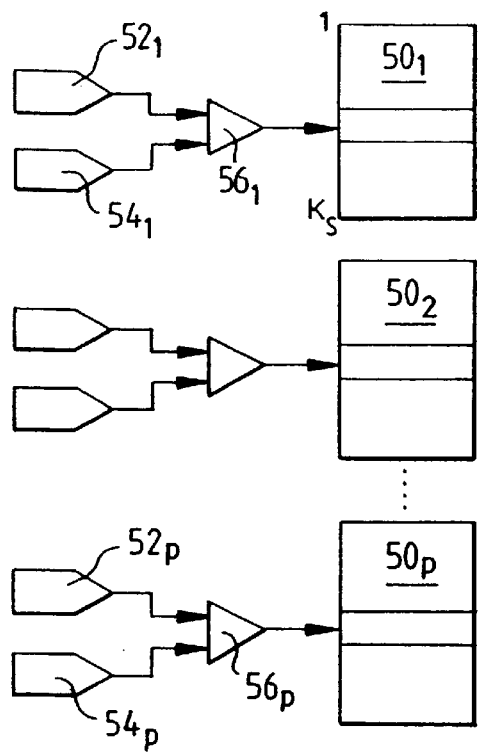
FIG. 2 is a block diagram of the circuit controlling free locations of the shared sub-buffers of the unit from FIG. 1.

Transmitting asynchronous data in the form of packets or cells is a standard technique; there is therefore no need to describe it here. A switching unit can be used for any type of asynchronous transfer of packets or cells of fixed or variable length.

The switching unit 10 shown in the figures has $n_1$ inputs $12_1, 12_2, \ldots, 12n_1$ and $n_2$ outputs. For simplicity, in the following description $n_1=n_2=32$.

The digital data applied to each input $12_i$ is in the form of packets or cells 44 (FIG. 1a) divided into data blocks $46_1$, $46_2$, etc. of fixed length. Each data block includes c bits (for example c=64 bits).

Each input $12_i$ is connected to the input of a serial/parallel input register $14_i$ having a serial input and a parallel output for a data block of c bits. Bits of the same weight, i.e. the same rank, of each parallel output of the registers $14_i$ are connected to the input of rank in of a multiplexer $16_1$ through $16_c$ with $n_1$ inputs. Accordingly, as shown, the least significant bit, of rank 1, on the right of each register $14_i$ is connected to the input of rank i of the multiplexer $16_1$. Likewise, the most significant bit, of rank c, at the output of the register $14_i$ is connected to the input of rank i of the multiplexer $16_c$.

The outputs of the multiplexers $16_1$ through $16_c$ constitute a parallel output 17 on c bits. At any given time the signal on the parallel output corresponds to the parallel output of a register $14_i$ and therefore to an input $12_i$.

The parallel output is connected to a corresponding parallel input of the virtual shared buffer 18 in accordance with the invention.

The output of the virtual shared buffer 18 is also a parallel output on c bits. Each bit is applied to the input of a demultiplexer $20_1$ through $20_c$. Each demultiplexer $20_K$ has $n_2$ outputs. The demultiplexers are associated with parallel/serial output registers $22_1$ through $22n_2$. Each demultiplexer corresponds to a bit of a particular weight associated with a corresponding input of a register $22_i$. Accordingly, as shown, the demultiplexer $20_i$ is allocated to the least significant bit and the first output of the demultiplexer $20_1$ is connected to the first input (of rank 1) of the register $20_1$ and the last output (of rank $n_2$) of the register $20_1$ is connected to the input of rank 1 of the register $22n_2$.

Likewise, the $n_2$ outputs of the demultiplexer $20_c$ are connected to all the inputs of rank c (most significant bit) of the respective registers $22_1$ through $22n_2$.

The outputs of the registers $22_1$ through $22n_2$ constitute the serial outputs $24_1$, through $24n_2$ of the switching unit 10.

In accordance with the invention the virtual shared buffer 18 comprises p shared sub-buffers $30_1, 30_2, \ldots, 30_p$. The shared sub-buffers $30_i$ are all identical, for example, and all have the same capacity of $K_s$ words each of c bits.

Each shared sub-buffer $30_1$ has a parallel input $32_i$ on c bits, like the parallel output 17. All the parallel inputs $32_1$ through $32_p$ of the shared sub-buffers receive the parallel signal from the output 17 from the multiplexers $16_1$ through $16_c$. In other words, the same c parallel bits from the multiplexers $16_K$ are replicated at each of the inputs $32_i$ of the shared sub-buffers. These inputs constitute write inputs. At given times a write select circuit 34 commands writing in one of the shared sub-buffers $30_i$ of a word on c bits from the output 17.

Each output $36_i$ of a shared sub-buffer $30_i$ is also a parallel output on c bits.

The outputs $36_i$ are connected to the corresponding inputs $38_i$ of c OR gates 40 in parallel; for simplicity only one OR gate 40 is shown. The outputs 41 of the c OR gates 40 are also parallel outputs on c bits and are connected to the parallel inputs 43 formed by the inputs of the demultiplexers $20_1$ through $20_c$.

At any given time a circuit 42 for selecting a shared sub-buffer to read authorizes one of the shared sub-buffers to transmit its data block on c bits to the c OR gates 40.

Write operations and read operations have previously been referred to. By "write" is meant placing a data block in memory at a free location of a shared sub-buffer. By "read" is meant extracting a data block from a location of a shared sub-buffer.

As mentioned above, for simplicity, the operation of the unit 10 is described for the situation where $n_1=n_2=32$. The number of time slots being equal to the number of inputs (and of outputs) of the switching unit 10, operation is in cycles of 32 time slots each of duration t (for example t=10 ns) which means that the duration of a cycle is T=32×t (for example 320 ns).

Referring to FIG. 1b, during each time slot of rank i the data block from the input $12_i$ of the same rank is written and the data block to read is transferred to the output $24_i$ of rank i.

In accordance with one aspect of the invention, during a time slot $t_i$ (FIG. 1b) the data block to be transmitted to the output i can be read in a first shared sub-buffer at the same time as a data block from the input i is written in a different shared sub-buffer.

For example, during time slot i, shared sub-buffer $30_1$ is written and shared sub-buffer $30_2$ is read.

The shared sub-buffers are controlled in such way that selecting the shared sub-buffer to read takes priority. Consequently, the choice of the sub-buffer in which the data block from the input of rank i is to be written at time $t_i$ is restricted by the prohibition on writing in the shared sub-buffer selected to read, here buffer $30_2$.

Clearly, unlike prior art switching units, the time allocated to reading is equal to the whole of the time slot. Similarly, writing can occupy the whole of the time slot. This property of simultaneously reading and writing the equivalent virtual shared buffer results from the fact that at least two parallel shared sub-buffers are provided.

Accordingly, for a given cycle duration, the time allocated to write and read operations is maximized, unlike prior art switching units in which each time slot must be shared to effect these operations at different times.

A virtual shared buffer 18 formed of p shared sub-buffers $30_1$ through $30_p$ requires memory location control means significantly different from those encountered with a (conventional) single shared buffer. This is why various embodiments of the circuits for controlling free and occupied locations in the shared sub-buffers will now be described with reference to FIGS. 2 through 6.

Free location control (FIGS. 2 and 3) supplies the address of a free location in a shared sub-buffer for each data block received that is to be written. Occupied location control (FIGS. 4 and 5) preserves the order of the data blocks to be addressed in succession on each reading of a data block to be transmitted.

The free location control circuit shown in FIG. 2 comprises p free location chaining memories $50_1, \ldots, 50_p$, one for each shared sub-buffer.

Each chaining memory $50_1, \ldots, 50_p$ comprises $K_s$ words or lines ($K_s$ is the number of words of c bits that a sub-buffer $30_I$ can contain) each of $B_2$ bits, where $B_2=\log_2 K_s$ (logarithm of $K_s$ to base 2). For example, if $K_s=8$ then $B_2=3$.

Conventionally, each chaining memory $50_1, \ldots, 50_p$ is associated with a pair of pointers, namely a start of chained list pointer $52_1, \ldots, 52_p$ and an end of chained list pointer $54_1, \ldots, 54_p$. The start of chained list pointer $52_K$ is a register containing the address, or the identity, of the first free location in the corresponding shared sub-buffer $30_K$, for example, and the end of chained list pointer $54_K$ is also a register containing the address, or the identity, of the last free location in the shared sub-buffer $30_K$.

In FIG. 2, the output of each pointer $52_K$, $54_K$ is connected to the respective input of a multiplexer $56_K$. This is a simplified representation, however. The two main operations that can be effected with a chaining memory (containing a chained list of objects) and a pair of pointers will now be summarized. The first operation is to select a first object from the top of the list. To this end the top of chained list pointer $52^K$ indicates the identity of the first object and supplies the address at which the next object in the chained list of the buffer $50_K$ is stored. The identity of the next object is extracted from the buffer $50_K$ and fed into the register $52_K$. The second basic operation consists in adding a new object to the end of the list. In this case, the identity of the new object is written at the address designated by the end of chained list pointer. The latter is updated with the identity of the new object.

Accordingly, the free location list start pointer corresponding to the shared sub-buffer selected for reading indicates the free location offered for writing and an update is effected in the corresponding chained list memory.

Figure 3:
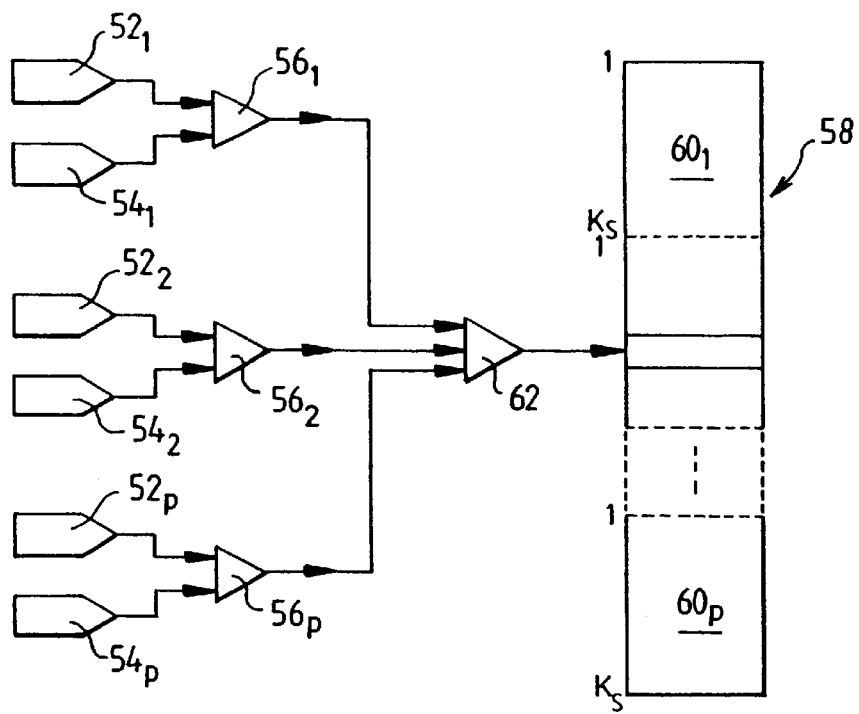
FIG. 3 is a variant of FIG. 2.

In the variant shown in FIG. 3 there is a single free location chaining memory 58 for all the shared sub-buffers $30_1$ through $30_p$. The memory 58 comprises $p \times K_s$ words each of $B_2$ bits, where $B_2=\log_2 K_s$.

The memory 58 includes memory locations $60_1$ through $60_p$ each of which has substantially the same function as the buffer $50_1$ through $50_p$ of the embodiment described with reference to FIG. 2.

As previously, there are p pairs of pointers $52_K$, $54_K$ and each pair is associated with a multiplexer $56_K$. However, unlike the embodiment described previously, another multiplexer 62 receives the outputs of the various multiplexers $56_K$ so that at any given time only one input is addressed in the buffer 58.

One embodiment of the circuit controlling occupied locations in the shared sub-buffers 30 will now be described with reference to FIGS. 4 and 5.

Given that, for reading, the data blocks must be output in a particular order, the occupied locations are managed using a single pair of pointers (for each of the $n_2$ outputs of the switching unit), namely a start of list pointer 64 and an end of list pointer 66 (FIGS. 4 and 5). The data blocks delivered on each of the $n_2$ outputs of the switching unit 10 generally come from different shared sub-buffers but they must not be controlled by dynamically distributing their successive data blocks into the various shared sub-buffers.

In the example shown in FIG. 4, chaining memories $68_1$ through $68_p$ are provided. Each chaining memory has a capacity of $K_s$ words each of $B_3$ bits where $B_3=\log_2(p \times K_s)$. In this example, the outputs of the pointers 64 and 66 are connected to the inputs of a two-input multiplexer 70 whose output is connected to the input of a p-output demultiplexer 72 connected to respective inputs of the chaining memories 68 through $68_p$.

Note that the number of bits $B_3$ of each word in the memories $68_K$ is dictated by the fact that, for reading, all possible memory locations in the virtual shared buffer, i.e. in all the shared sub-buffers, must be considered, which is a total of $p \times K_s$ locations.

In the variant shown in FIG. 5, rather than providing p chaining memories there is a single memory 74 with a capacity of $p \times K_s$ words each of $B_3$ bits. As before $B_3=\log_2 (p \times K_s)$.

In this embodiment it is not necessary to provide a demultiplexer like the demultiplexer 72 from FIG. 5.

A control circuit grouping together free and occupied locations will now be described with reference to FIG. 6.

As explained above in the context of separate control of free and occupied locations, grouped control must provide a chained list of free locations for each shared sub-buffer and a single chained list of occupied locations (for each output) for all of the shared sub-buffers.

The embodiment shown in FIG. 6 simultaneously controls a read operation and a write operation without halving the access time allocated to the common chaining memories.

Thus p common memories $80_1$ through $80_p$ for chaining free and occupied locations are used, p being the number of shared sub-buffers. Each of these memories has a capacity of $poK_s$ words each of $B_3$ bits where $B_3=\log_2(p \times K_s)$ Remember that each sub-buffer has a capacity of $K_s$ words each of c bits.

There are p pairs of start and end of chained list pointers $82_K$, $84_K$ for controlling the p chained lists of free locations and a single pair 86, 88 (for each output) of start and end of chained list pointers for controlling each chained list of occupied locations (for each output) for all of the sub-buffers.

Compared to the embodiment described with reference to FIGS. 2 through 5, the memory capacity used is less than the sum of the separate memory capacities for controlling free and occupied locations. The same capacity is used as in FIGS. 4 and 5 (occupied location control). The total number of memory locations needed in this case is at most equal to the number of memory locations in all of the shared sub-buffers because, at any given time, the sum of the free and occupied locations is equal to the total capacity. In other words, at any given time a memory location is either free or occupied and cannot be free and occupied at the same time.

The pointers 86 and 88 (for each output) relating to the occupied locations are connected to the inputs of a multiplexer 90 connected to a p-output demultiplexer 92. Each output of the demultiplexer is connected to a respective input of a two-input multiplexer $94_1, \ldots, 94_p$, the other input of which is connected to the output of a multiplexer $96_K$ receiving the start and end of chained list pointers $82_K$ and $84_K$ for the free locations. The output of the multiplexer $94_K$ is associated with a corresponding input of the corresponding chaining list memory $80_K$.

With regard to the access time to the common chaining memory for controlling the two chained lists, in a conventional switching unit with a single shared buffer also including a common chaining memory of this kind the access time allocated to the common memory is equal to the access time to the single shared buffer. Accordingly, in a conventional single shared buffer switching unit the access time to a common chaining memory for reading (or writing) is equal to the access time to the shared buffer for reading (or writing), i.e. typically half a time slot.

In contrast, with the solution shown in FIG. 6, read and write operations are effected simultaneously in two different shared sub-buffers 30 and the corresponding free location chained list and occupied location chained list control operations can be effected simultaneously in two different common chaining memories, respectively corresponding to the two different shared sub-buffers in which the read operation and the write operation are effected. Accordingly, compared to a prior art switching unit with a single shared buffer, the access time allocated to the chaining memories is increased in the same way as the access time allocated to the buffer for each read or write operation is increased.

Although FIGS. 2 through 6 have been used to describe free and occupied location control circuits based on the technique of chained lists in chaining memories, it goes without saying that the invention is not limited to this embodiment. Other control techniques can be used, such as first-in-first-out queues. In this case a list of free locations for each sub-buffer is required for writing and a single list of occupied locations (for each output) is required for reading.

Figure 7:
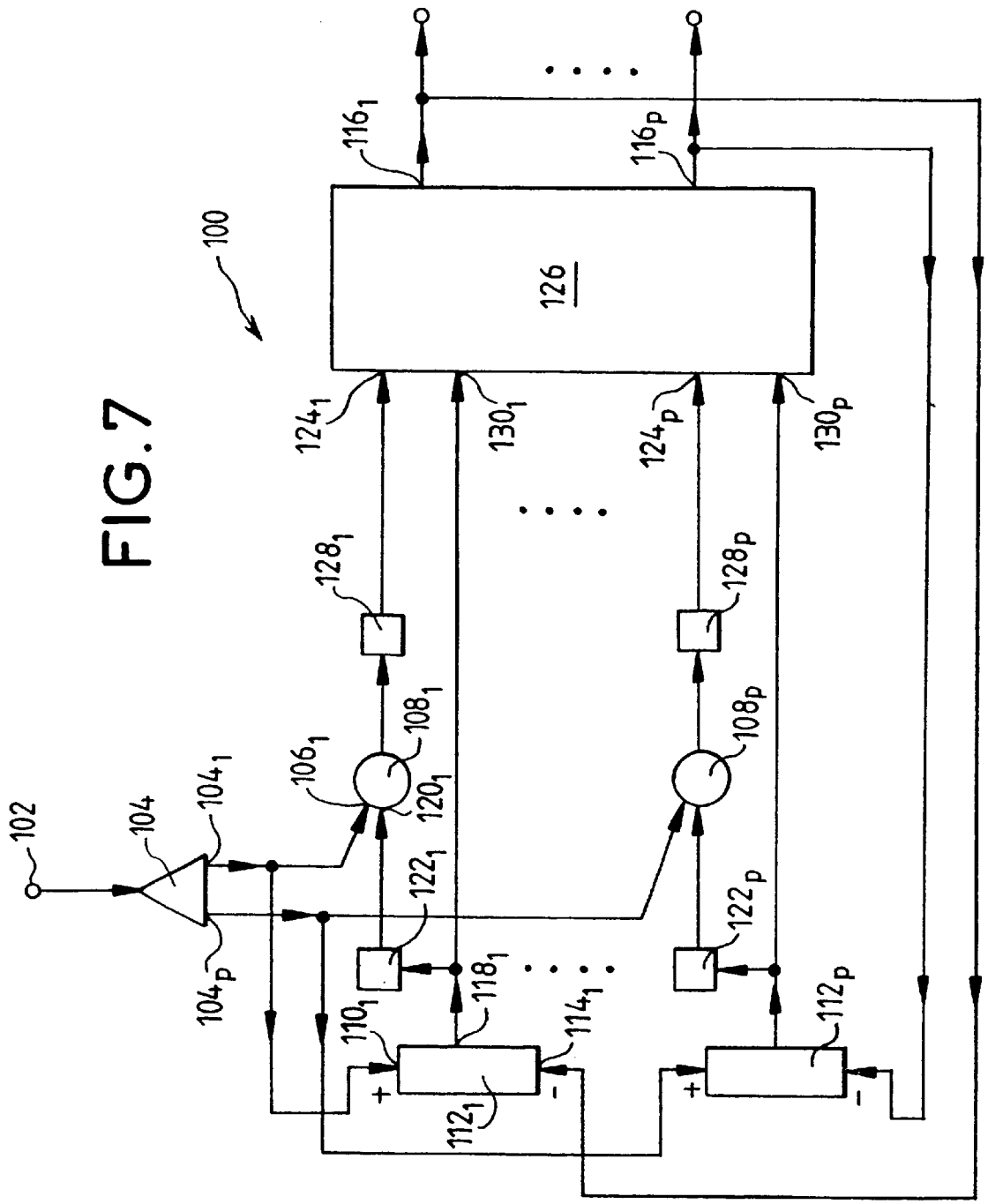
FIG. 7 is a block diagram of the circuit for selecting a shared sub-buffer to write for the unit from FIG. 1.

One embodiment of the circuit for selecting the shared sub-buffer to use for writing at a given time will now be described with reference to FIG. 7.

This circuit 100 is under the control of an occupied location control unit (not shown in FIG. 7) which combines all the functions needed to control the transfer of data blocks across the switching unit.

That unit supplies at an input 102 a code indicating the shared sub-buffer selected for reading. The shared sub-buffer used for reading therefore cannot be selected for writing.

The input 102 is connected to the input of a p-output demultiplexer 104 where p is the number of shared sub-buffers. Each output $104_1, \ldots, 104_p$ of the demultiplexer 104 is connected to the first input $106_K$ of an OR gate $108_K$ and to the count input $110_K$ of a counter-downcounter $112_K$ supplying at its output $188_K$ a code representing the number of free locations in the corresponding shared sub-buffer of rank K.

Each counter-downcounter $112_K$ also has a downcount input $114_K$ connected to the output $116_K$ of the circuit 100 at which appears a signal controlling selection of the shared sub-buffer for writing.

Thus each counter $112_K$ is incremented by one unit for each read operation in the corresponding shared sub-buffer and decremented by one unit for each write operation in the corresponding sub-buffer.

The output $118_K$ of the counter $112_K$ is connected to the second input $120^K$ of the OR gate $108_K$ by a zero value test unit $122_K$. The output of the OR gate $108_K$ is connected through an inverter $128_K$ to the input $124_K$ of a circuit 126 for selecting the least heavily loaded shared sub-buffer.

The output $118_K$ of the counter $112_K$ is also connected to another input $130_K$ of the circuit 126 for selecting the least heavily loaded shared sub-buffer.

The signal applied to the input $124_K$ is a signal on 1 bit indicating if the shared sub-buffer of rank K is a candidate for writing. This shared sub-buffer may not be available for writing either because it has already been selected for reading, as indicated (where appropriate) by the signal at the output $104_K$ of the demultiplexer 104, or because it has no free location, as indicated by the device $122_K$ which supplies a signal indicating whether the number of free locations is zero or not.

Thus the circuit 126 receives for each shared sub-buffer a signal indicating if that sub-buffer is a candidate for writing (on an input $124_K$) and a signal representing the number of free locations (on the input $130_K$).

The circuit 126 selects the shared sub-buffer having the greatest number of free locations and, of course, which is also a candidate for writing. If there is more than one sub-buffer with the same greatest number of free locations one of them is chosen arbitrarily, for example at random or in a predetermined order.

If no read operation is commanded there is a wider choice of sub-buffers for writing because any sub-buffer having a free location can be chosen.

A switching unit 10 having the same number of inputs and outputs has been described hereinabove. However, the number of inputs and the number of outputs can be different. In this case the cycle T includes two types of time slot: time slots in which simultaneous reading and writing is possible (as described above) and time slots in which only reading or writing is possible.

If the number of outputs $n_2$ is greater than the number of inputs $n_1$ the cycle T comprises $n_1$ time slots in which simultaneous reading and writing is possible and $n_2-n_1$ time slots in which only reading is possible.

If the number of inputs $n_1$ is greater than the number of outputs $n_2$ the cycle T comprises $n_2$ time slots in which simultaneous reading and writing is possible and $n_1-n_2$ time slots in which only writing is possible.

Compared to a prior art switching unit with a single shared buffer, the switching unit in accordance with the invention has an additional risk of blocking which can occur each time that the shared sub-buffer selected for reading has free locations when the other accessible shared sub-buffers do not have any free location. A risk of blocking of this kind is "additional" in that it does not arise in the conventional case of a single shared buffer (in which it is always possible to write in the last free location, regardless of which one that is).

The additional blocking probability decreases as the number p of shared sub-buffers increases. However, for simplicity it is in practice preferable to limit the number p to a relatively low value.

To reduce the risk of blocking it is advantageous for a new block of data to be written in the least heavily loaded shared sub-buffer (i.e. the one having the greatest number of free locations). However, strictly speaking, this improvement does not completely eliminate the additional risk of blocking. To eliminate the risk completely it is necessary to choose a sufficiently high capacity for the shared sub-buffers, namely a capacity of S' locations per shared sub-buffer such that S' is at least equal to S/(p−1) where S is the reference capacity of a prior art switching unit with a single shared buffer.

In other words, the capacity S' of each shared sub-buffer is such that (p−1) shared sub-buffers can receive the maximum throughput of write information with the same probability of congestion as a single shared buffer of capacity S.

In the unit in accordance with the invention, to eliminate the additional risk of blocking totally, compared to a prior art unit with a single shared buffer an additional capacity S' corresponding to one shared sub-buffer is therefore necessary.

Figure 8:
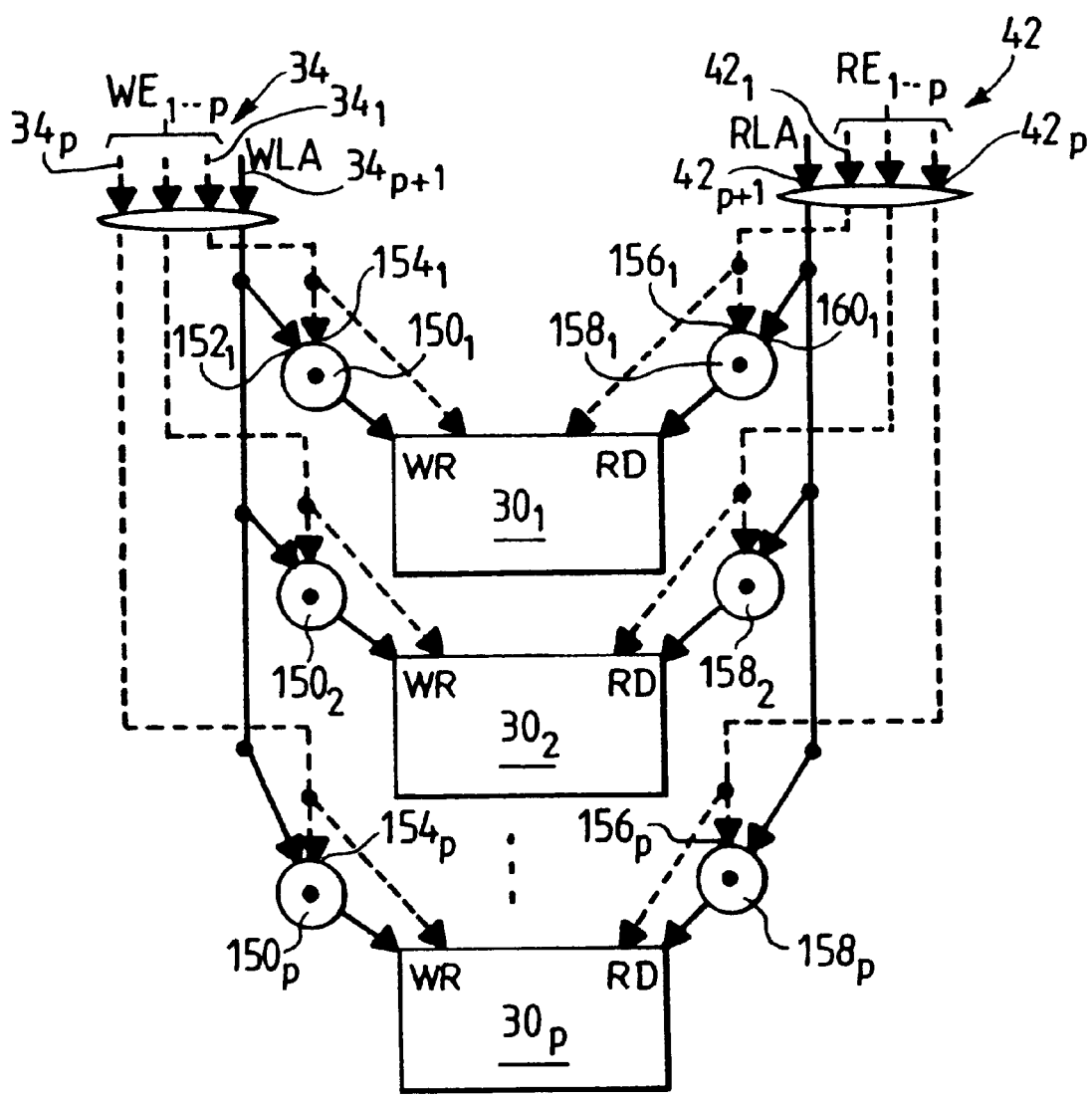
FIG. 8 is a partial view of the unit from FIG. 1 showing a variant of the control circuits.

FIG. 8 shows the connection between the selector circuits 34 and 42 and the shared sub-buffers $30_1$ through $30_p$.

Thus, for writing, the circuit 34 has p outputs $34_1$ through $34_p$ and an additional output $34_{p+1}$ supplying the address of the write location in the selected shared sub-buffer.

Each shared sub-buffer is thus allocated an AND gate $150_1, 150_2, \ldots, 150_p$ which receives at a first input $152_n$ the address of the location to write and at a second input $154_n$ the write instruction from one of the outputs $34_i$.

Similarly, the circuit 42 includes p outputs $42_1$ through $42_p$ connected to the inputs $156_1$ through $156_p$ of the AND gates $158_1$ through $158_p$ and an output $42_{p+1}$ connected to the second inputs $160_p$ of the AND gates 158. This output $42_{p+1}$ supplies the address of the location to read in the selected shared sub-buffer while the outputs $42_1$ through $42_p$ determine which of the shared sub-buffers is selected for reading.

As explained above, the write operations commanded by the circuit 34 and the read operations commanded by the circuit 42 can be effected simultaneously.

The control device of the invention is applicable not only to the shared buffer memory of a switch but also to input and output terminal modules with shared buffers used at the input and output of a switching network made up of one or more switch stages.

In an input (or output) terminal module, a shared buffer is conventionally used to store temporarily the data blocks (for example cells) received and then transmitted to one or more [n] incoming (or outgoing) connections; the embodiment chosen depends on the maximal traffic throughput that can be processed in a shared buffer, given that the overall time-multiplexed information throughput transferred into the memory is the product of the information throughput on each connection and the number [n] of multiplexed connections.

Given that the maximal traffic throughput that can be processed through a shared buffer is limited by the shortest time slot required to transfer each cell, which comprises a write operation and a read operation for each time cycle corresponding to one cell, the invention significantly increases the time allocated for effecting each write operation or each read operation in the buffer, in the terminal modules and in the switching units, considering the same given global information throughput in a terminal module. Conversely, for a given access time, the invention increases the global information throughput that a shared buffer can process in a terminal module, i.e. it caters for connections having a higher throughput or for a greater number of connections.

What is claimed is:

1. A control device for a shared buffer comprising:
   a plurality of shared sub-buffers;
   a write selector circuit for writing therein data blocks from inputs;
   a read selector circuit for reading said data blocks therein afterwards and directing them to at least one output, said two selector circuits including arbitration means for writing and reading data blocks in accordance with periodic cycles, each cycle including time slots during each of which a data block received at an input can be written into one of said shared sub-buffers and during which a data block previously written can be read and sent to a particular output;
   simultaneously writing a data block from an input in one shared sub-buffer and reading from a different shared sub-buffer a data block to be sent to an output, the whole of said time slot being allocated to said simultaneous reading of said data block and said writing of said data block, wherein selecting a sub-buffer for reading takes priority over selecting the same sub-buffer for writing; and wherein said arbitration means include means for arbitrating a single write access vis a vis a single read access during each time slot.

2. A control device according to claim 1, wherein the two selector circuits are such that, for each time slot, the choice of the sub-buffer for writing a data block depends on the state and/or the degree of filling of each of the shared sub-buffers.

3. A control device according to claim 2, wherein the two selector circuits are such that writing is effected in the least heavily loaded shared sub-buffer of those not selected for reading a data block.

4. A control device according to claim 2, wherein the two selector circuits include, for each shared sub-buffer, a counter for counting the number of free memory locations, said counter being incremented when the corresponding shared sub-buffer is selected for reading and decremented each time the corresponding shared sub-buffer is selected for writing.

5. A control device according to claim 3, wherein the two selector circuits include, for each shared sub-buffer, a counter for counting the number of free memory locations, said counter being incremented when the corresponding shared sub-buffer is selected for reading and decremented each time the corresponding shared sub-buffer is selected for writing, and wherein the two selector circuits include a circuit for selecting the least heavily loaded shared sub-buffer which has the same number of pairs of inputs as the number of shared sub-buffers, a first input of each pair receiving a signal indicating if the corresponding shared sub-buffer can be selected for writing or not and the second input of each pair receiving an output signal of the associated free location counter.

6. A control device according to claim 1, comprising, for writing in the shared sub-buffers, means for controlling free locations in the shared sub-buffers that manage a list of free locations for each shared sub-buffer.

7. A control device according to claim 6, wherein the means for controlling free locations include a memory for each shared sub-buffer in which a first-in-first-out type queue is stored.

8. A control device according to claim 6, wherein the means for controlling free locations include a chaining memory for each shared sub-buffer associated with a start of free locations list pointer and an end of free locations list pointer.

9. A control device according to claim 8, wherein the means for controlling free locations include a chaining memory for each shared sub-buffer, the number of lines in a chaining memory being at least equal to the number of available locations in the corresponding shared sub-buffer.

10. A control device according to claim 8, wherein the means for controlling free locations include a chaining memory common to all the lists, the number of lines in said memory being at least equal to the number of available locations in all the shared sub-buffers.

11. A control device according to claim 1, including means for controlling writing and reading such that data blocks to be transmitted successively to a particular output can be written into different shared sub-buffers and can therefore be read in different shared sub-buffers.

12. A control device according to claim 11, including means for controlling reading for transmitting the data to a particular output in a predetermined order, said read control means including means for controlling free locations using a single chained list of free locations for each output for all the shared sub-buffers.

13. A control device according to claim 12, wherein the occupied location control means, for reading, include a first-in-first-out queue type memory.

14. A control device according to claim 13, wherein the occupied location control means, for reading, include a chaining memory containing a chained list, the chaining memory being associated with a start of list pointer and an end of list pointer.

15. A control device according to claim 14, wherein the occupied location control means, for reading, include a number of chaining memories equal to the number of shared sub-buffers, the number of lines in each chaining memory being at least equal to the number of locations in the corresponding shared sub-buffer.

16. A control device according to claim 14, wherein the occupied location control means, for reading, include a chaining memory common to all the occupied location lists, the number of lines in the chaining memory being at least equal to the total number of locations in all the shared sub-buffers.

17. A control device according to claim 1, including means for grouped control of free locations for writing and occupied locations for reading, said grouped control means including the same number of chaining memories as there are shared sub-buffers, each chaining memory being used at the same time for controlling free locations and for controlling occupied locations, the number of lines in each of said chaining memories being equal to the number of locations available in the corresponding shared sub-buffer.

18. A grouped control device according to claim 17, including means for simultaneously updating lists of free locations and lists of occupied locations in different chaining memories.

19. A control device according to claim 1, wherein p shared sub-buffers all have a same capacity which is chosen so that p−1 shared sub-buffers can receive the maximum throughput of write information.

20. A switching unit including a control device for a shared buffer comprising: a plurality of shared sub-buffers;
a write selector circuit for writing therein data blocks from inputs; and
a read selector circuit for reading said data blocks therein afterwards and directing them to at least one output; said two selector circuits including arbitration means for writing and reading data blocks in accordance with periodic cycles, each cycle including time slots during each of which a data block received at an input can be written into one of said shared sub-buffers and during which a data block previously written can be read and sent to a particular output;
simultaneously writing a data block from an input in one shared sub-buffer and reading from a different shared sub-buffer a data block to be sent to an output, the whole of said time slot being allocated to said simultaneous reading of said data block and said writing of said data block, wherein selecting a sub-buffer for reading takes priority over selecting the same sub-buffer for writing; and wherein said arbitration means include means for arbitrating a single write access vis a vis a single read access during each time slot.

21. A switching unit according to claim 20, having the same number of inputs and outputs, and wherein, during each time slot said control device is able to write a data block and read a data block in the buffer simultaneously.

22. A switching unit according to claim 20, having different numbers of inputs and outputs, and wherein each cycle includes first time slots during which the control device can effect a write operation and a read operation simultaneously and second time slots during which it can perform only read operations or only write operations.

23. An input terminal module of a switching unit including a control device, said control device comprising:
a plurality of shared sub-buffers;
a write selector circuit for writing therein data blocks from inputs; and
a read selector circuit for reading said data blocks therein afterwards and directing them to at least one output; said two selector circuits including arbitration means for writing and reading data blocks in accordance with periodic cycles, each cycle including time slots during each of which a data block received at an input can be written into one of said shared sub-buffers and during which a data block previously written can be read and sent to a particular output;

simultaneously writing a data block from an input in one shared sub-buffer and reading from a different shared sub-buffer a data block to be sent to an output, the whole of said time slot being allocated to said simultaneous reading of said data block and said writing of said data block, wherein selecting a sub-buffer for reading takes priority over selecting the same sub-buffer for writing; and wherein said arbitration means include means for arbitrating a single write access vis a vis a single read access during each time slot.

24. An output terminal module of a switching unit including a control device, said control device comprising:

a plurality of shared sub-buffers;

a write selector circuit for writing therein data blocks from inputs; and a read selector circuit for reading said data blocks therein afterwards and directing them to at least one output; said two selector circuits including arbitration means for writing and reading data blocks in accordance with periodic cycles, each cycle including time slots during each of which a data block received at an input can be written into one of said shared sub-buffers and during which a data block previously written can be read and sent to a particular output;

simultaneously writing a data block from an input in one shared sub-buffer and reading from a different shared sub-buffer a data block to be sent to an output, the whole of said time slot being allocated to said simultaneous reading of said data block and said writing of said data block, wherein selecting a sub-buffer for reading takes priority over selecting the same sub-buffer for writing; and wherein said arbitration means include means for arbitrating a single write access vis a vis a single read access during each time slot.

* * * * *